United States Patent [19]
Tanaka et al.

[11] Patent Number: 5,754,364
[45] Date of Patent: May 19, 1998

[54] MAGNETIC DISK APPARATUS

[75] Inventors: Tsutomu Tanaka, Hiratsuka; Takayuki Suzuki, Yokohama; Seiichi Baba, Kamakura; Hiroshi Katou, Hadano; Keisuke Yamaoka, Odawara, all of Japan

[73] Assignee: Hitachi, Ltd., Tokyo, Japan

[21] Appl. No.: 262,670

[22] Filed: Jun. 20, 1994

[30] Foreign Application Priority Data

Jun. 23, 1993 [JP] Japan .................................. 5-152152

[51] Int. Cl.$^6$ ........................................... G11B 5/48
[52] U.S. Cl. ........................... 360/97.01; 360/104
[58] Field of Search ............................. 360/104–106, 360/97.01

[56] References Cited

U.S. PATENT DOCUMENTS 5,291,360   3/1994   Foote ................................ 360/104

FOREIGN PATENT DOCUMENTS 57-109125   7/1982   Japan .
63-167489   7/1988   Japan .
3-097173    9/1989   Japan .

*Primary Examiner*—John H. Wolfe
*Attorney, Agent, or Firm*—Fay Sharpe Beall Fagan Minnich & McKee

[57] ABSTRACT

An apparatus having a magnetic head assembly including a plurality of arms each arm having a magnetic head fixed to a nose portion thereof and a magnetic disk unit having a plurality of magnetic disks mounted on a rotating shaft. The spacing between adjacent magnetic disks being set at a value corresponding to the thicknesses of the magnetic heads fixed to two of the arms, plus the thickness of the two arms, plus a rotating gap of the magnetic heads, plus a space of 0.1 mm or less. Further included is a disk height measuring device and a head measuring device for measuring the heights of the disks and the magnetic heads. An expansion device expands the spacing between the adjacent arms. The spacing between the adjacent arms being expanded an appropriate amount to provide optimal operation of the magnetic disk apparatus.

1 Claim, 7 Drawing Sheets

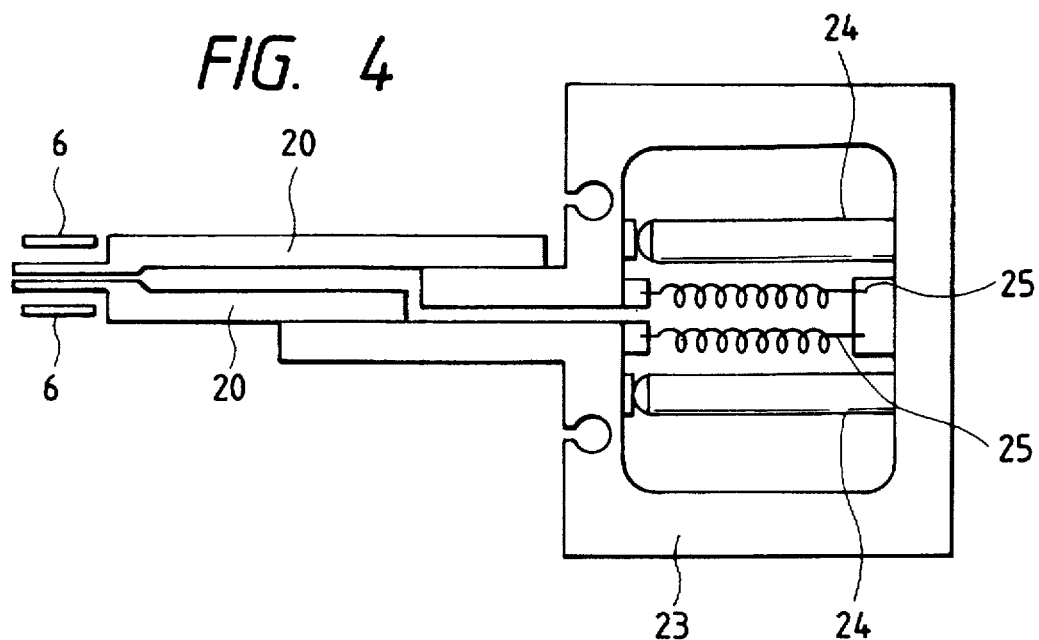
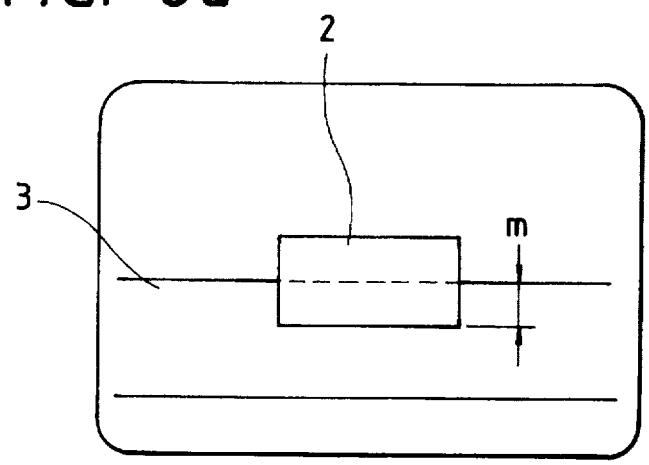
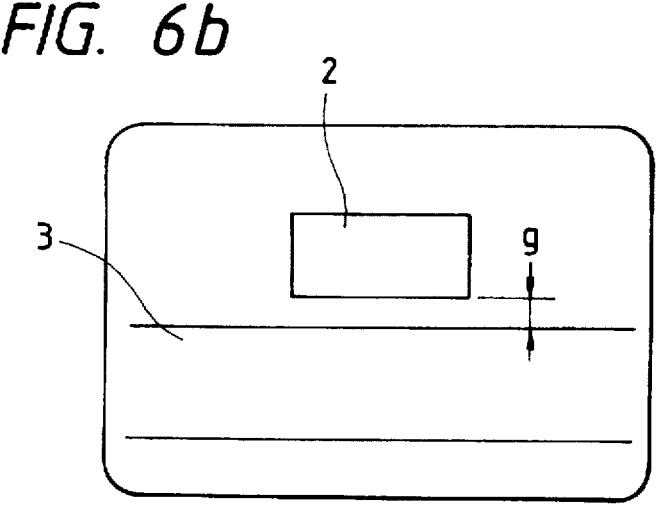

5,754,364

MAGNETIC DISK APPARATUS

BACKGROUND OF THE INVENTION

The present invention relates to a magnetic disk apparatus as well as an assembling method and apparatus for inserting magnetic heads of the magnetic head apparatus each between adjacent magnetic disks.

Magnetic disk apparatuses are widely used as storage systems in computers and word processors, while with an increase in storage capacity, there is an increasing demand for the reduction in size of the apparatus.

Such magnetic disk apparatuses are each constituted roughly by magnetic disks and a magnetic head assembly. To meet the above demand, however, it is necessary to not only reduce the size of the magnetic disk apparatus but also increase the number of information recording magnetic disks, so that the spacing between adjacent magnetic disks becomes smaller.

Usually six to eight magnetic disks are used in a magnetic disk apparatus. In assembling the apparatus, magnetic heads are each inserted between adjacent ones of six to eight magnetic disks and are then brought into contact slowly with the disk faces. If each magnetic head is contacted with the associated magnetic disk face during this inserting operation, there will occur such inconvenience as a flaw or damage.

In view of this problem there has been proposed a method wherein each arm of a magnetic head assembly is restricted from the outside or from the inside by means of a jig to provide a certain spacing and is then inserted between adjacent magnetic disks, as disclosed in Japanese Patent Laid Open Nos. 57-109125 and 63-167489.

There has also been adopted a method wherein each arm is expanded from the inside by using a stacked electrostatic actuator, as disclosed in Japanese Patent Laid Open No. 3-97173.

In inserting a magnetic head in between adjacent magnetic disks, as mentioned above, there is performed a preparatory work of inserting a jig between adjacent arms with magnetic heads in a magnetic head assembly fixed thereto to provide a certain spacing. For this work is required a high accuracy which permits insertion of a jig into a slight arm-to-arm gap in a magnetic head assembly, and thus the work in question is troublesome.

Further, as the spacing between adjacent magnetic disks becomes still narrower, a dimensional error of the constituent parts and their assembling error exert a greater influence when the assembly accuracy of magnetic disks and magnetic head assembly is taken into account; as a result, with such a jig of providing a certain spacing as mentioned above, it becomes more likely that magnetic disks and magnetic heads will contact each other at the time of insertion of the heads, causing a flaw or damage.

SUMMARY OF THE INVENTION

It is the object of the present invention to solve the above-mentioned problem, namely the problem that as the spacing between adjacent magnetic disks becomes narrower, an assembling error of magnetic heads and that of a magnetic head assembly become more and influential, and provide a magnetic disk apparatus and a method as well as a method and apparatus for assembling the magnetic disk apparatus, involving measuring the height of each magnetic disk and that of each magnetic head, then controlling the height of each magnetic head to a level not causing its contact with the associated magnetic disk, and inserting each magnetic head in between adjacent magnetic disks to effect assembly.

In one aspect of the present invention, in a magnetic disk apparatus assembling method involving inserting magnetic heads in between plural magnetic disks, the magnetic heads being fixed to nose portions of plural arms mounted in a magnetic head assembly, and thereafter contacting the magnetic heads with the surfaces of the magnetic disks to assemble the magnetic disk apparatus, there is provided an improvement comprising measuring the height with respect to both sides of each magnetic disk in the disk assembly and the height of each magnetic head in the magnetic head assembly, supporting the plural arms with the magnetic heads fixed thereto at predetermined heights on the basis of the results of the above measurement, moving the magnetic head assembly to the disk assembly by a predetermined distance, and bringing the magnetic heads supported at the above predetermined heights into contact with the magnetic disk surfaces.

In another aspect of the present invention, in an apparatus for assembling a magnetic disk apparatus including a magnetic head assembly and a disk assembly with plural magnetic disks mounted on a rotary shaft, the magnetic head assembly having plural arms with magnetic heads fixed to nose portions thereof, there provided an improvement further including a disk height measurement system for measuring the height with respect to both sides of each magnetic disk, a head measurement system for measuring the height of each magnetic head, an expansion system capable of being removably inserted between plural arms with magnetic heads fixed thereto and capable of expanding the arm-to-arm spacing to a desired extent, a calculation system for making comparative calculation with respect to the measurement results for the height of each magnetic disk and that of each magnetic head, a control system for controlling the amount of expansion of the expansion system on the basis of the results of the calculation, and a travel system for inserting each magnetic head expanded at a predetermined height into the spacing between adjacent magnetic disks.

The expansion system capable of expanding the arm-to-arm spacing to a desired degree comprises fingers capable of being inserted between arms with opposed magnetic heads fixed thereto, a block having notches at one end thereof connected to the fingers, and a drive source for inching the notched block.

The height measurement system for magnetic disk and magnetic head include a beam splitter, e.g. dichroic mirror, in front of an object lens in an image sensor and is constructed so that the disk-head height measurement position be set in or near a focal point of the object lens.

In a further aspect of the present invention there is provided a magnetic disk apparatus having a magnetic head assembly wherein a projection is formed on an arm portion which projects to the exterior of the magnetic disk outer periphery upon insertion of a magnetic head between magnetic disks, as well as an apparatus for assembling the magnetic disk apparatus which assembling apparatus supports the projection of the arm by an expansion system and makes control while controlling the height of the magnetic head.

In a still further aspect of the present invention there is provided a magnetic disk apparatus wherein the spacing between adjacent magnetic disks is set at a value corresponding to the thickness of magnetic heads fixed to two arms plus the thickness of the two arms plus a floating gap of the magnetic heads plus a space of 0.1 mm or less.

In the method and apparatus for assembling a magnetic disk apparatus according to the present invention, since the heights of the magnetic head and magnetic disk opposed to each other are measured and the magnetic head is positioned in conformity with the height of the magnetic disk by means of an expansion system comprising a notch mechanism and an inching drive source and thereafter inserted, it is possible to assemble the magnetic disk apparatus in high yield without mutual contact of the disk and the head.

Moreover, since opposite heights of the magnetic head and magnetic disk present in positions spaced from each other are measured simultaneously by a single measurement system, it is possible to minimize a measurement error.

Further, since a projection is formed on each arm in the magnetic head assembly and it is supported by the expansion system, it is no longer necessary to insert the expansion system between magnetic disks and hence it becomes possible to thicken the projection supporting portion of the expansion system, thereby permitting stiffness to be enhanced. Consequently, positioning of each magnetic head in its height direction can be done with a higher accuracy.

In the present invention, a dimensional error of the constituent parts and their assembling error do not exert any influence on the assembling work, and insertion errors are only an error of the magnetic disk and head height measuring system and a positioning error in the height direction of each magnetic head. In the construction of the present invention, a space of 0.1 mm or less is sufficient as a marginal space for such errors, and the spacing between adjacent magnetic disks can be set at a value corresponding to the thickness of magnetic heads fixed to two arms plus the thickness of the two arms plus a floating gap of the magnetic heads plus a space of 0.1 mm.

According to the present invention, as set forth above, since it is possible to narrow the disk spacing, a larger number of magnetic disks can be accommodated within a magnetic disk apparatus of a certain volume, so that a high storage capacity can be ensured.

BRIEF DESCRIPTION OF THE DRAWINGS

FIG. 4 is a diagram showing a magnetic head positioning system in the assembling apparatus according to the present invention;

FIGS. 6a and 6b are conceptual diagrams showing information of a magnetic head height and that of a magnetic disk height both picked up by an image sensor;

DESCRIPTION OF THE PREFERRED EMBODIMENTS

Embodiments of the present invention will be described hereinunder with reference to the accompanying drawings.

Figure 1:
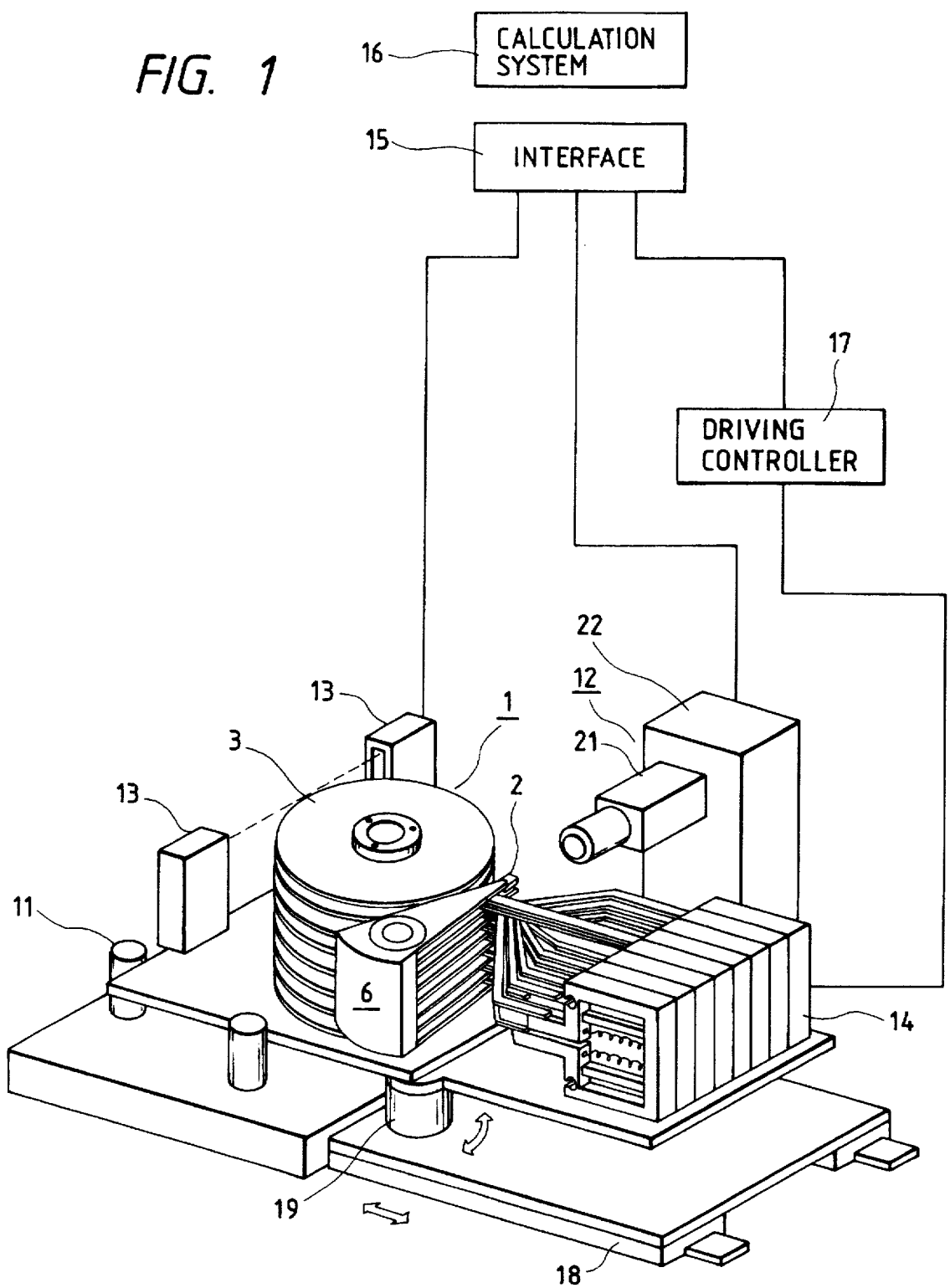
FIG. 1 is a diagram showing an apparatus for assembling a magnetic disk apparatus according to an embodiment of the present invention.

FIG. 1 illustrates an apparatus for assembling a magnetic disk apparatus according to an embodiment of the present invention. This assembling apparatus comprises positioning pieces 11 for setting the position of a magnetic disk apparatus 1, a head measurement system 12 for measuring a vertical position of each magnetic head 2, the head measurement system 12 being connected to an interface 15, a disk measurement system 13 for measuring a vertical position of each magnetic disk 3, the disk measurement system 13 being connected to the interface 15, a head height positioning system 14 connected to a driving controller 17 to control the height of each magnetic head 2, the interface 15 and a calculation system 16 for calculating the results of the measurement with respect to the height of each magnetic head 2 and that of each magnetic disk 3 and controlling the driving controller 17, and the driving controller 17 for controlling the head height positioning system 14, the driving controller 17 being connected to the interface 15. The head height positioning system 14 is mounted on both a travel stage 18 and a rotary stage 19 capable of moving and rotating, respectively, in the directions of arrows in FIG. 1.

Figure 2:
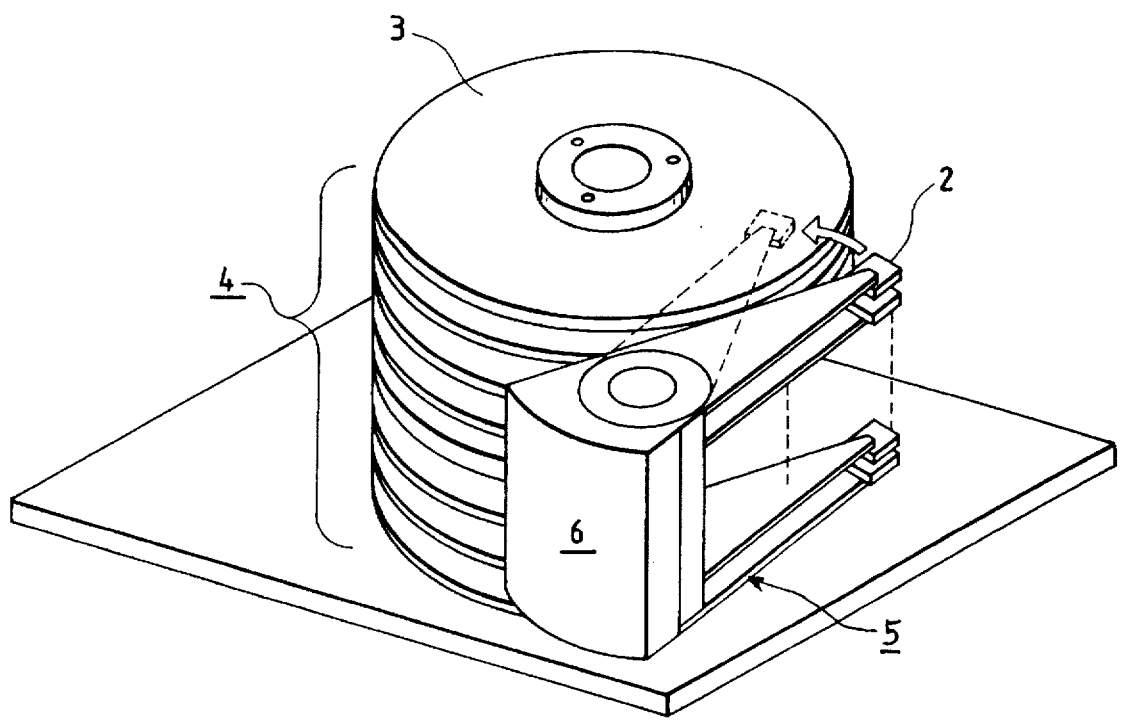
FIG. 2 is a perspective diagram of a magnetic disk apparatus embodying the present invention.

FIG. 2 illustrates an appearance of the magnetic disk apparatus 1. The magnetic disk apparatus 1 comprises a disk assembly 4 of plural magnetic disks 3 and a magnetic head assembly (also called a carriage portion) 5. The magnetic head assembly 5 comprises a plurality of resilient arms (also called a suspension) 6 and the magnetic heads 2 fixed to nose portions of the arms 6, respectively.

Figure 3:
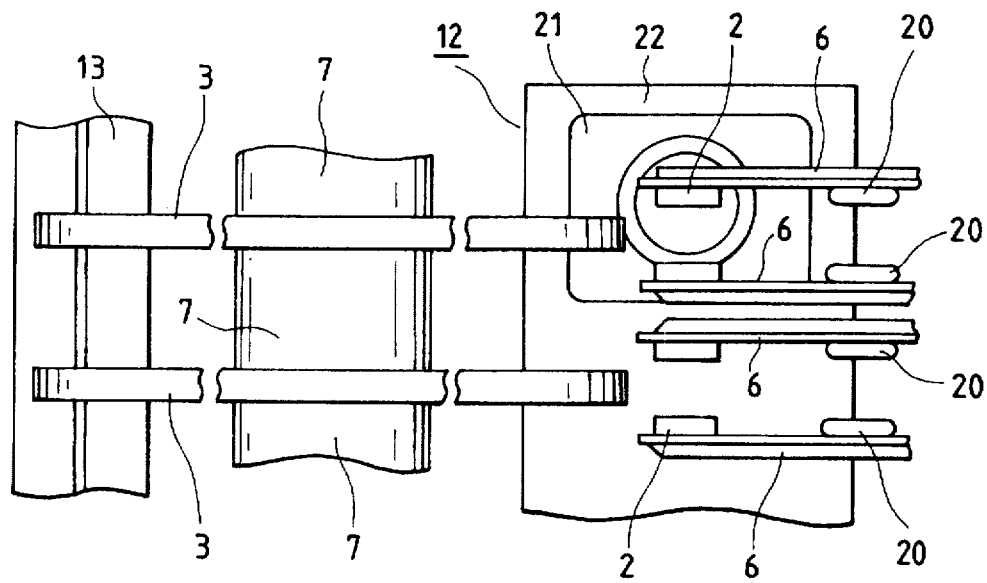
FIG. 3 is a diagram showing a state of measurement for magnetic head and magnetic disk in the assembling apparatus according to the present invention.

FIG. 3 is an enlarged diagram showing a relation among plural magnetic heads 2, plural magnetic disks 3, head measurement system 12, disk measurement system 13, and fingers 20 of the head height positioning system 14 (ref. FIG. 1), the fingers 20 being positioned at a front end portion of the head height positioning system 14 to support the arms 6.

Figure 7A:
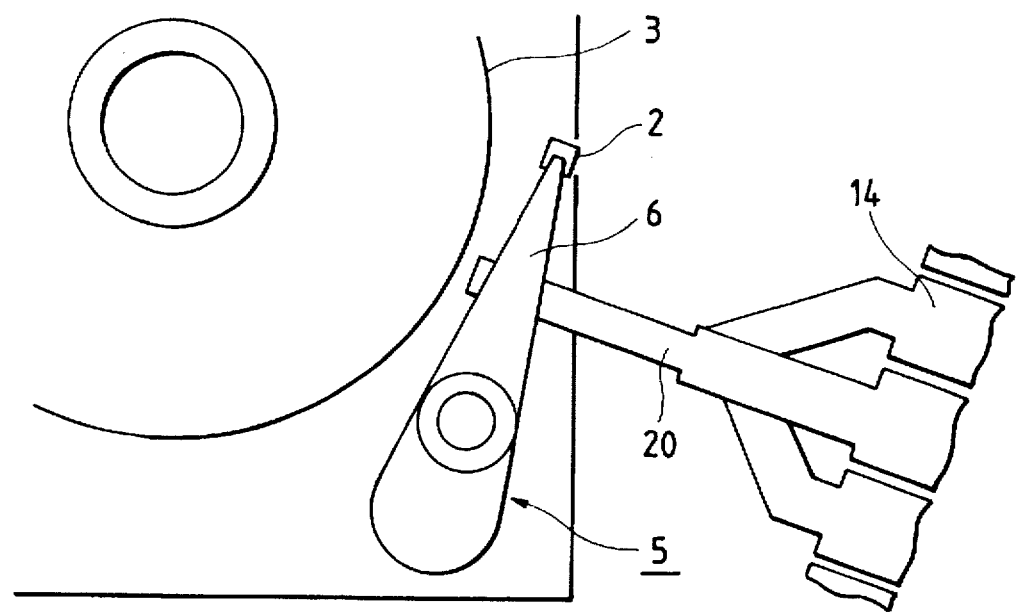
FIGS. 7a and 7b are diagrams showing a state before insertion of a magnetic head between magnetic disks and a state after the insertion.
Figure 7B:
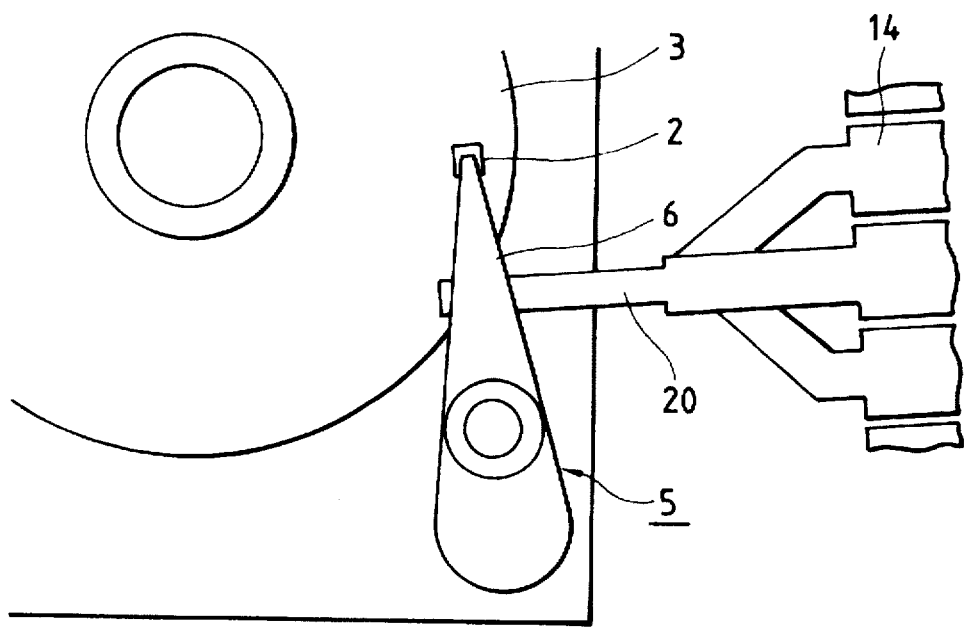

The magnetic disks 3 are mounted alternately with spacers 7 on a rotating shaft (not shown) of a spindle motor which is fixed to a housing of a magnetic disk apparatus 1. The magnetic heads 2 are fixed to nose portions of the resilient arms 6 which are mounted on a rotating shaft of the magnetic head assembly 5 (ref. FIGS. 7a and 7b).

The disk measurement system 13 radiates a laser beam to both faces of the outer periphery of each magnetic disk 3 to measure the height of a light shielded portion.

The head measurement system 12 comprises an image sensor, e.g. CCD camera, 21 and a Z-stage 22 with the image sensor attached thereto, and it measures the height of an end face of each magnetic head 2 which end face is in contact with the surface of the associated magnetic disk 3. The head measurement system 12 and the disk measurement system 13 are each subjected to calibration with respect to the position of origin to make reference adjustment of an absolute value in the vertical direction.

FIG. 4 illustrates a detailed structure of the head height positioning system 14 which is shown in FIG. 1. According to the illustrated structure, piezoelectric elements 24 are incorporated in a box-shaped notch block 23 having notches at one end thereof, extension springs 25 are mounted to the notch block 23 so as to keep close contact between the notch block and the piezoelectric elements 24, and fingers 20 are attached to a front end portion on the notched side of the block 23. Front end portions of the fingers 20 can be inserted between adjacent arms 6 with magnetic heads 2 fixed thereto oppositely, in the assembling work, and are thinner than the magnetic heads 2.

Figure 5A:
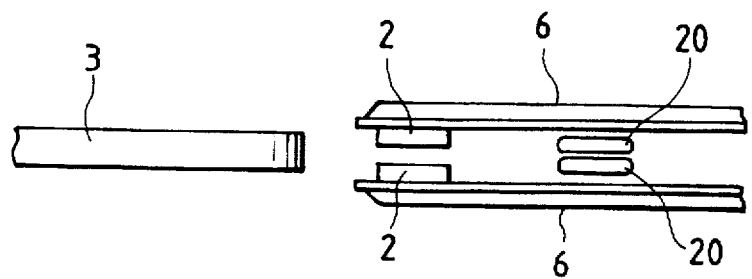
FIGS. 5a to 5e are explanatory diagrams showing in what sequence each magnetic head is inserted between adjacent magnetic disks.

A magnetic disk apparatus assembling sequence will now be described with reference to not only FIGS. 1 to 4 but also FIGS. 5a to 7b. First, the travel stage 18 is moved forward, allowing fingers 20 of the head height positioning system 14 to be inserted between arms 6 with magnetic heads 2 in the magnetic head assembly 5 fixed thereto, as shown in FIG. 5a. At this time, the fingers 20 are not open.

Figure 5B:
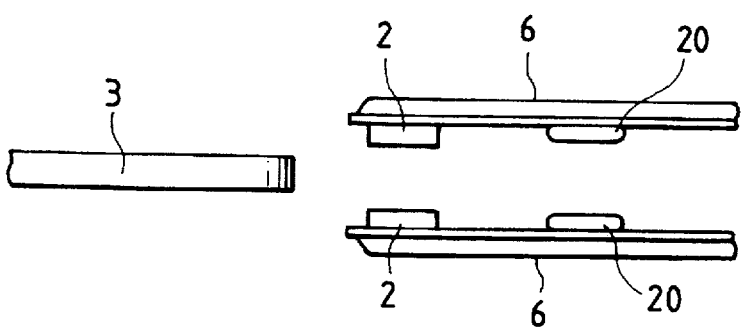

Next, as shown in FIG. 5b, a control voltage is inputted to the piezoelectric elements 24 in the head height positioning system 14 to open the fingers 20 into contact with the arms 6. Then, the arms 6 are expanded to set the two magnetic heads 2 at predetermined heights.

For explaining the amount of opening of the fingers 20, reference is here made to the conceptual diagrams of FIGS. 6a and 6b wherein a value obtained by measuring a vertical position of each magnetic disk 3 in the disk measurement system 13 is incorporated as data in a picture plane obtained by picking up the image of each magnetic head 2 with the CCD camera 21. As shown in FIG. 6a, if a vertical overlap between magnetic disk 3 and magnetic head 2 in the state of FIG. 5a is m as shown in FIG. 6a and the disk 3—head 2 spacing in the state of FIG. 5b is g as shown in FIG. 6b, the fingers 20 are opened in such a manner that the height of the magnetic head is m+g.

Figure 5C:
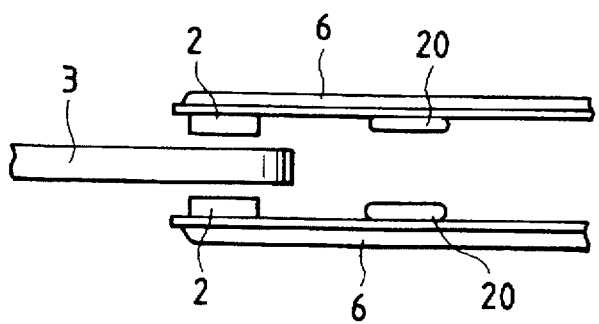

Next, by rotating the rotary stage 19, the magnetic head assembly 5 rotates in synchronism with the head height positioning system 14, whereby the magnetic heads 2 are each inserted between magnetic disks 2 (in a sandwiching relation to each magnetic disk), as shown in FIG. 5c. This operation is illustrated in a more easily understandable form in FIGS. 7a and 7b. Corotation of the magnetic head assembly 5 with the head height positioning system 14 and the resulting insertion of each magnetic head 2 between magnetic disks are shown in FIGS. 7a and 7b, of which the former illustrates the state before the insertion and the latter, after the insertion.

Figure 5D:
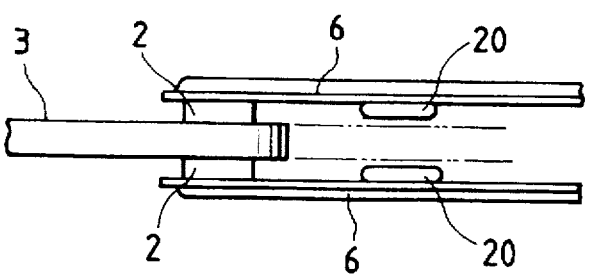

Then, as shown in FIG. 5d, the fingers 20 are closed to bring the magnetic heads 2 to come into contact with both faces of the associated magnetic disk 3 by controlling the control voltage applied to the piezoelectric elements 24 in the head height positioning system 14. At this time, the fingers 20 are moved to vertical positions not in contact with both faces of the magnetic disk 3. (In order to realize this operation, the thickness of the front end portion of each finger 20 must be smaller than that of each magnetic head, as noted previously.)

Figure 5E:
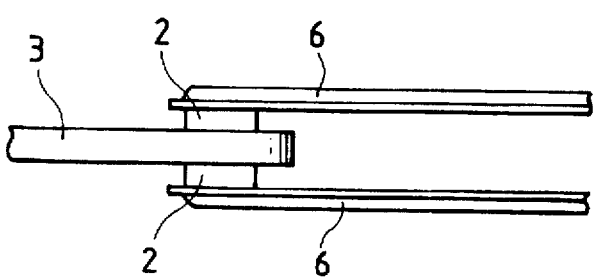

Next, the fingers 20 are pulled out from between arms 6 by returning the rotary stage 19 and travel stage 18 to their initial positions. Now the assembly of the magnetic disk apparatus is completed as shown in FIG. 5e and the assembling sequence is over.

Figure 8A:
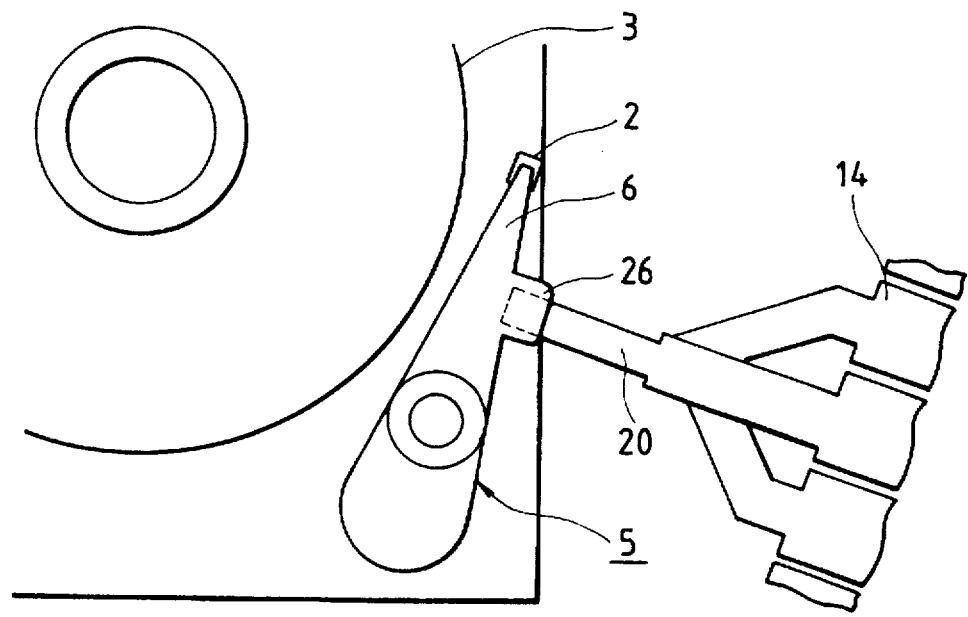
FIGS. 8a and 8b are diagrams showing a state before insertion of a magnetic head between magnetic disks and a state after the insertion, both in the presence of a projection formed on the arm side.
Figure 8B:
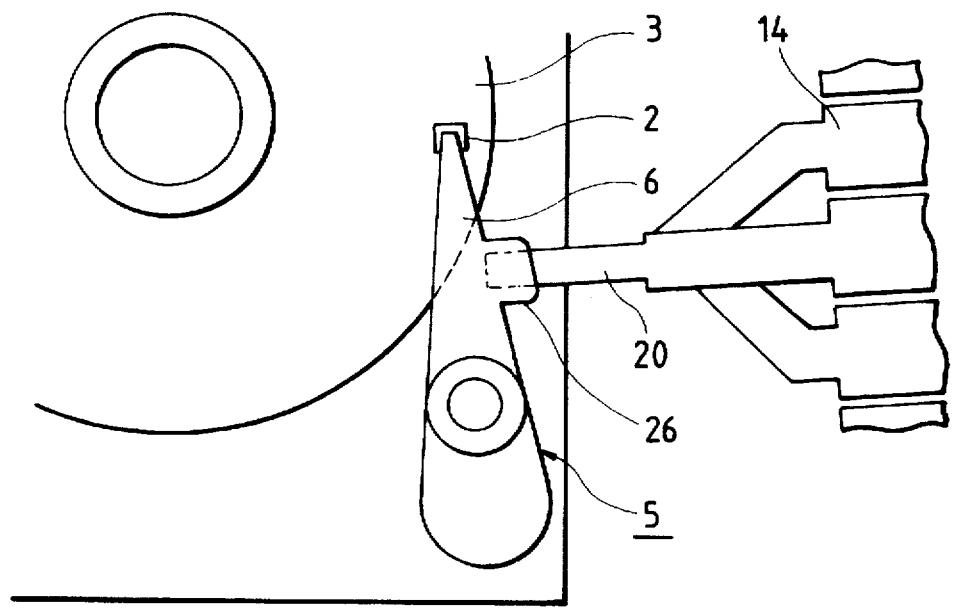

FIGS. 8a and 8b illustrate another embodiment wherein the shape of each arm 6 in the magnetic head assembly 5 is different from that shown in the preceding embodiment. A projection 26 is formed on a portion of each arm 6 which portion assumes a position outside the outer periphery of each magnetic disk 3 when the magnetic head on the arm side is inserted between magnetic disks 3 to assemble the apparatus. The projection 26 is supported by a corresponding finger 20 in the head height positioning system 14. According to this structure, it is no longer necessary to insert the finger 20 up to a position between magnetic disks 3 even in the state before insertion shown in FIG. 8a and that after insertion in FIG. 8b. Besides, it becomes possible to make the front end portion of each finger 20 thicker than each magnetic head 2, whereby the stiffness of the finger 20 can be enhanced and so the variations in resilience of arms 6 can be madeless influential, thus permitting highly accurate positioning in the vertical direction of the magnetic head 2.

Figure 9:
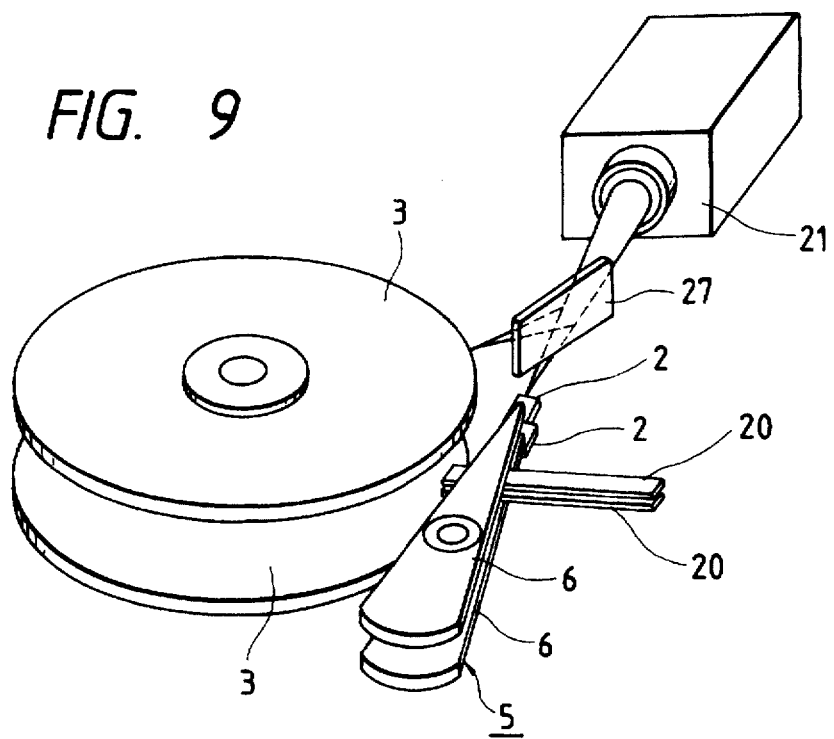
FIG. 9 is a perspective diagram showing a height measurement system, which picks up images of both magnetic head and magnetic disk simultaneously.

FIG. 9 illustrates a further embodiment wherein a single detector is used in common to both head measurement system 12 and disk measurement system 13. In the embodiment shown in FIGS. 1 and 3 it is necessary to make calibration of an absolute value in the vertical direction in each of the head and disk measurement systems 12, 13 because both systems are provided separately, and even when such calibration is made, it is impossible to eliminate error completely. This problem can be solved by the embodiment being considered.

A dichroic mirror 27 is disposed in front of CCD camera 21 so as to focus on both magnetic disk 3 and magnetic head 2, whereby it is made possible to detect the height of each magnetic disk 3 and that of each magnetic head 2 using a single CCD camera 21. In this case, real images capable of being picked up by the CCD camera 21 can be used as the images of both magnetic disk 3 and magnetic head 2 shown in FIGS. 6a and 6b.

Figure 10:
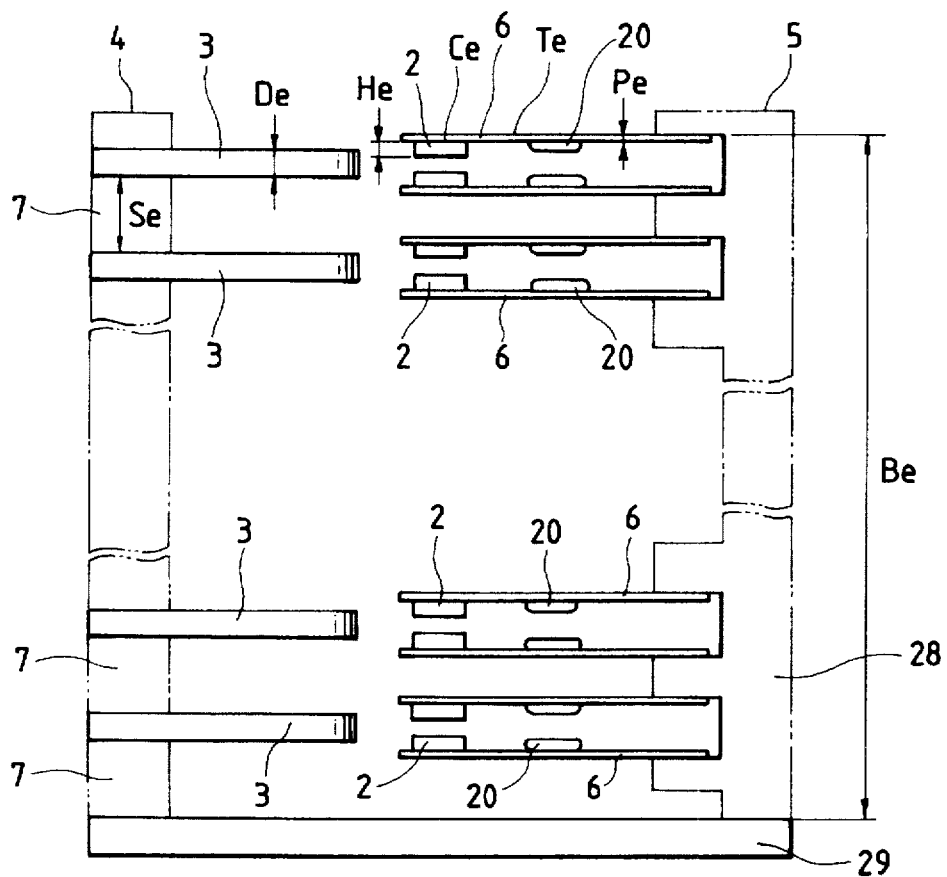
FIG. 10 is a construction diagram explaining an error in the height direction of a disk assembly and that of a magnetic read assembly.

FIG. 10 is a detailed sectional view of both disk assembly 4 and magnetic head assembly 5 in the magnetic disk apparatus 1. With reference to this figure, description is now directed to their errors in the vertical direction. The disk assembly 4 comprises plural magnetic disks 3 and plural spacers 7. As respective errors in the thickness (height) direction there exist an error of ±De of each magnetic disk 3 and an error of ±Se of each spacer 7.

On the other hand, the magnetic head assembly 5 comprises a rotatable support block 28 with arms 6 mounted thereto and magnetic heads 2 which are fixed to nose portions of the arms 6 using a bond or the like. As errors in the thickness (height) direction in the magnetic head assembly 5 there exist an error ±Be of the support block 28, a thickness error ±Pe of each arm 6, a thickness error ±He of each magnetic head 2 and a fixing error +Ce in the use of a bond or the like. Further, since each finger 20 for supporting each arm 6 is inserted in a position spaced from the magnetic head 2, the arms 6 are different in the amount of deflection due to variations in their resilience, so there also exists an error ±Te in such amount of deflection.

Accordingly, when the aforesaid errors are considered together, assuming that the number of magnetic disks 3 is eight, a surface error Dh of the top magnetic disk 3 in the disk assembly 4 is:

$$Dh = \sqrt{8De^2 + 8Se^2} \tag{1}$$

De: error of the magnetic disk 3
Se: error of the spacer 7
A height error Fh of the top magnetic head 2 corresponding to the top magnetic disk 3 is:

$$Fh = \sqrt{Be^2 + Pe^2 + He^2 + Ce^2 + Te^2} \qquad (2)$$

Be: error of the support block 28
Pe: thickness error of the arm 6
He: thickness error of the magnetic head
Ce: fixing error in the use of a bond or the like
Te: error in the amount of deflection
The errors are set as follows:
De=±10 μm, Se=±10 μm, Be=±50 μm,
Pe=±5 μm, He=±30 μm, Ce=±20 μm, Te=±50 μm, From equation (1), the error in the thickness direction of the top magnetic disk 3 is:

Dh=±40 μm

From equation (2), the error in the thickness direction of the top magnetic head 2 is:

Fh=±80 μm

If the flatness (We) of a base plate 29 to which the magnetic disk assembly 4 and the magnetic head assembly 5 are mounted is 10 μm (±5 μm), an error (Ne) of the insertion mechanism at the time of inserting each magnetic head 2 between magnetic disks 3 is ±30 μm and a margin value (V) is ±30 μm, the following space as a maximum value is required between the surface of magnetic disk 3 and magnetic head 2:

$$\begin{aligned}(Dh + Fh + We + Ne + Y) &= (40 + 80 + 5 + 30 + 30)\,\mu m \\ &= 185\,\mu m\end{aligned}$$

However, if the height of magnetic disk 3 and that of the magnetic head 2 opposed to each other per se are measured according to the present invention, errors are only measurement error in such measurement and error of the insertion mechanism.

Such measurement error (Ke) and insertion mechanism error (Me) can each be made ±10 μm by adopting the constructions illustrated in FIGS. 9 and 4, and if the margin value (Y) is ±30 μm, which is the same as above, the following value is sufficient as the space between the disk surface and the head 2:

$$\begin{aligned}(Ke + Me + Y) &= (10 + 10 + 30)\,\mu m \\ &= 50\,\mu m\end{aligned}$$

Thus, according to the present invention, since the spacing between the surface of one magnetic disk 3 and magnetic head 2 may be 50 μm as mentioned above, the magnetic disk spacing may be a value corresponding to the thickness of magnetic heads 2 fixed to two arms 6 plus the thickness of the two arms plus the total spacing 100 μm between the surfaces of two magnetic disks and associated magnetic heads 2 plus a floating gap of the heads.

According to the method of the present invention involving measuring and assembling magnetic disks 3 and magnetic heads 2, the disk spacing can be narrowed by 135 μm, so the height can be lowered a total of 2,160 μm because there are sixteen magnetic heads 2 in the case where the number of magnetic disks is eight. Generally, since the height of the magnetic disk apparatus 1 is set at a constant value, it is possible to mount a larger number of magnetic disks 3 if the disk spacing can be narrowed.

According to the method and apparatus of the present invention, since the assembling work is done while measuring the height of each magnetic disk and that of each magnetic head relative to each other, it is possible to improve the assembling yield without contact of both, whereby there can be realized a less expensive magnetic disk apparatus. Further, since the assembling work is performed on the basis of measurement as mentioned above, even a narrow insertion space will do and hence it is possible to narrow the magnetic disk spacing. Consequently, a larger number of magnetic disks can be accommodated within a fixed volume and it is possible to realize a magnetic disk apparatus having a high storage capacity.

What is claimed is:

1. A magnetic disk apparatus comprising:

a magnetic disk unit having a stack of a plurality of magnetic disks mounted on a rotating shaft;

a magnetic head assembly having a stack of a plurality of arms each arm having a thickness giving a specific resiliency, and each arm having a magnetic head fixed to a nose portion of each of the arms, each of said arms being fixed at a root portion to a shaft rotatable as said head assembly, and stacked at said shaft at a space to a neighboring arm, so that each pair of said arms is insertable between a corresponding pair of neighboring disks in said magnetic disk unit, without contacting the neighboring disks; and each of said magnetic disks in said magnetic disk unit being spaced at a spacing value as much as thicknesses of two arms and two heads fixed to said two arms, added with a floating height of each of the two heads and a further spacing of less than 0.1 mm.

\* \* \* \* \*